United States Patent
Lee

(10) Patent No.: US 7,817,449 B2
(45) Date of Patent: Oct. 19, 2010

(54) POWER SUPPLY APPARATUS FOR ATTENUATING NOISE

(75) Inventor: Seung-hak Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 451 days.

(21) Appl. No.: 11/872,768

(22) Filed: Oct. 16, 2007

(65) Prior Publication Data

US 2008/0285315 A1 Nov. 20, 2008

(30) Foreign Application Priority Data

May 15, 2007 (KR) .................. 10-2007-0047247

(51) Int. Cl.
*H02M 1/12* (2006.01)

(52) U.S. Cl. .................. 363/39; 363/16; 363/37; 363/41; 363/48

(58) Field of Classification Search .......... 363/16, 363/37, 39, 40, 41, 44, 47, 48
See application file for complete search history.

(56) References Cited

U.S. PATENT DOCUMENTS

| | | | | |
|---|---|---|---|---|
| 5,757,628 A | * | 5/1998 | Kamata | 361/40 |
| 6,765,811 B1 | * | 7/2004 | Chang | 363/39 |
| 6,775,157 B2 | * | 8/2004 | Honda | 363/39 |
| 6,781,444 B2 | * | 8/2004 | Pelly | 327/552 |
| 6,847,530 B2 | * | 1/2005 | James | 363/39 |
| 2003/0128558 A1 | * | 7/2003 | Takahashi et al. | 363/39 |
| 2004/0223350 A1 | * | 11/2004 | James | 363/40 |

* cited by examiner

*Primary Examiner*—Jeffrey L Sterrett
(74) *Attorney, Agent, or Firm*—Stanzione & Kim LLP

(57) ABSTRACT

A power supply to improve an EMI characteristic and an electronic device having the power supply. The power supply includes a power converter to convert an alternating current (AC) power applied from outside to a direct current (DC) power, a ground portion to supply a ground power to the power converter and a noise attenuator to reduce noise by blocking a harmonic current generated by a driving of the power converter from passing through the ground portion. Accordingly, the stable ground power can be supplied to the internal elements by avoiding the potential change of the ground power and the noise caused by the flow of the harmonic current can be reduced by shortening the harmonic current path. Therefore, the EMI characteristic can be improved.

24 Claims, 8 Drawing Sheets

POWER SUPPLY APPARATUS FOR ATTENUATING NOISE

CROSS-REFERENCE TO RELATED APPLICATIONS

This application claims priority under 35 U.S.C. §119 (a) from Korean Patent Application No. 10-2007-0047247, filed on May 15, 2007, in the Korean Intellectual Property Office, the disclosure of which is incorporated herein in its entirety by reference.

BACKGROUND OF THE INVENTION

1. Field of the Invention

The present general inventive concept relates generally to a power supply apparatus (power supply) and an electronic device including the power supply. More particularly, the present general inventive concept relates to a power supply to avoid a potential change of a ground power and enhancing EMI characteristic by reducing a length of a harmonic current path, and an electronic device including the power supply.

2. Description of the Related Art

In general, electronic devices performing a certain function with electronic elements, for example, image forming apparatuses for printing image on a printing medium such as printers, copiers, multifunction peripherals (MFP), and fax machines, receive a commercial alternating current (AC) power from outside and convert the AC to a driving power of a potential level suitable for each electronic device. To execute preset functions of the electronic devices, the power supply is required for converting the commercial AC power to the driving power.

Of the power supplies, a Switching Mode Power Supply (SMPS) is mostly frequently used. The SMPS switches DC power, which is obtained by rectifying and smoothing the commercial AC power input from the outside, to a certain high frequency, e.g., to a high frequency of about 100 kHz to convert to a desired voltage using a transformer in high efficiency.

Typically, the power supply such as SMPS needs a ground power together with the commercial AC power to provide a ground potential to each element of the power supply. Accordingly, a ground part for supplying the ground power is included in the power supply.

The layout pattern of the ground part is formed as large as possible to ensure a stable potential level of the ground power, that is, to prevent a change of the potential level of the ground power. To supply the stable ground power to the internal elements, the internal elements are commonly grounded to the ground part as constructed above.

However, when the commercial AC power of a sine wave is applied to the internal elements of the electronic device, every internal device through which the current flows acts as the source of harmonic current. As the internal devices are commonly grounded to the ground part, the current path of the harmonic current is lengthened. Accordingly, a long current path may increase noise components and noise problems. The noise increase may cause deterioration of an electromagnetic interference (EMI) characteristic of the power supply.

Therefore, to avoid the degradation of the EMI characteristic, what is needed is a method to reduce a harmonic current path and to maintain a stable potential of the ground power.

SUMMARY OF THE INVENTION

The present general inventive concept provides a power supply to supply a stable ground power by preventing a potential change of the ground power and to enhance an EMI characteristic by reducing the harmonic current path.

The present general inventive concept also provides an electronic device including the power supply.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may also be achieved by providing a power supply apparatus that includes a power converter to convert an alternating current (AC) power applied from outside to a direct current (DC) power, a ground portion to supply a ground power to the power converter and a noise attenuator to reduce noise by blocking a harmonic current generated by a driving of the power converter from passing through the ground portion.

The noise attenuator may have an inductance component.

The noise attenuator may be a bead.

The noise attenuator may be integrally formed with the ground portion.

The noise attenuator may be formed in a maximum resistance area in a region of the ground portion.

The ground portion may include a multilayered structure including a plurality of substrates. The noise attenuator may be formed in a jumper area to connect the ground portion on the substrates.

The ground portion may have a layout including a substrate and a connection line, and the noise attenuator may be formed in at least one of a place where a distance between one connection line and an other connection line relatively decreases and a place where a cross-section of the connection line relatively decreases.

The power converter may include a first rectifier/smoother circuit to convert the AC power to a first DC power, a pulse generator driven by the first DC power to generate a pulse signal of a preset period, a transformer driven by the pulse signal to convert the first DC power to a second AC power of a preset level and a second rectifier/smoother circuit to convert the second AC power to the second DC power.

The pulse generator may be a pulse width modulator (PWM).

The foregoing and/or other aspects and utilities of the general inventive concept may also be achieved by providing an electronic device includes a power supply apparatus to convert I AC power applied from outside to a driving power and output the driving power, and an operating portion including at least one internal element which is driven by the output driving power, to perform a preset function. The power supply apparatus includes a power converter to convert the AC power to the driving power, a ground portion to supply a ground power to the power converter, and a noise attenuator to reduce noise by blocking a harmonic current generated by the driving of the power converter from passing through the ground portion.

The noise attenuator may have an inductance component.

The noise attenuator may be a bead.

The noise attenuator may be integrally formed with the ground portion.

The noise attenuator may be formed in a maximum resistance area in a region of the ground portion.

The ground portion may include a multilayered structure including a plurality of substrates. The noise attenuator may be formed in a jumper area for connecting the ground portion in the substrates.

The ground portion may have a layout including a substrate and a connection line. The noise attenuator may be formed in at least one of a place where a distance between one connection line and an other connection line relatively decreases and a place where a cross-section of the connection line relatively decreases.

The operating portion may be an image forming apparatus which is driven by the driving power to print image data on a recording medium.

The power converter may include a first rectifier/smoother circuit to convert the AC power to a first DC power, a pulse generator driven by the first DC power to generate a pulse signal of a preset period, a transformer driven by the pulse signal to convert the first DC power to a second AC power of a preset level and a second rectifier/smoother circuit to convert the second AC power to the second DC power.

The stable ground power can be supplied to the internal elements by avoiding the potential change of the ground power and the noise caused by the flow of the harmonic current can be reduced by shortening the harmonic current path. Therefore, the EMI characteristic can be improved.

The foregoing and/or other aspects and utilities of the general inventive concept may also be achieved by providing a power supply apparatus including a ground portion to provide ground power and a noise attenuator unit disposed at a maximum resistance portion of the ground portion to reduce a harmonic current path through the ground portion and to maintain a stable potential of the ground power.

The foregoing and/or other aspects and utilities of the general inventive concept may also be achieved by providing a method of supplying power the method including converting alternating current (AC) power applied from outside to direct current (DC) power by a power converter, supplying ground power to the power converter by a ground portion and reducing noise by blocking harmonic current generated by driving of the power converter from passing through the ground portion by a noise attenuator.

The foregoing and/or other aspects and utilities of the general inventive concept may also be achieved by providing a computer-readable recording medium having embodied thereon a computer program to execute a method, wherein the method includes converting alternating current (AC) power applied from outside to direct current (DC) power by a power converter, supplying ground power to the power converter by a ground portion and reducing noise by blocking harmonic current generated by driving of the power converter from passing through the ground portion by a noise attenuator.

BRIEF DESCRIPTION OF THE DRAWINGS

These and/or other aspects and utilities of the present general inventive concept will become apparent and more readily appreciated from the following description of exemplary embodiments, taken in conjunction with the accompanying drawings of which.

DETAILED DESCRIPTION OF THE PREFERRED EMBODIMENTS

Figure 1:
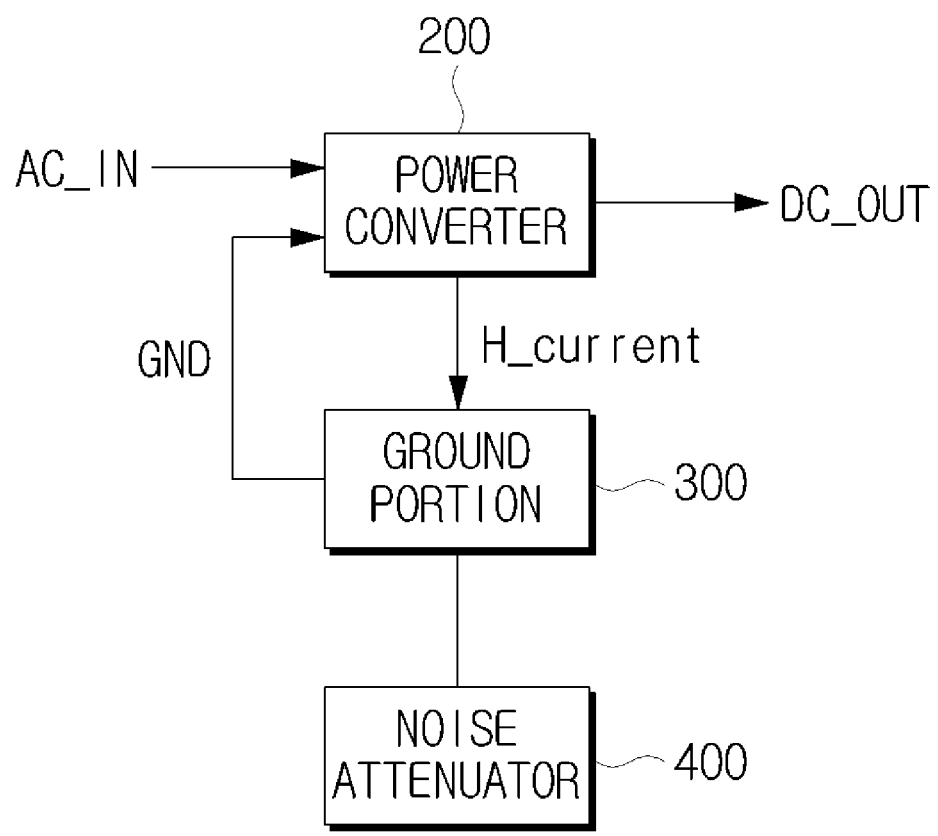
FIG. 1 is a simplified diagram illustrating a power supply according to an exemplary embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a simplified diagram illustrating a power supply according to an exemplary embodiment of the present general inventive concept.

The power supply 100 of FIG. 1 includes a power converter 200, a ground portion 300, and a noise attenuator 400.

The power converter 200 receives a commercial alternating current (AC) power AC_IN from outside, converts the AC power to a direct current (DC) power of a certain potential level, and outputs DC_OUT. The power converter 200 includes signal converting elements therein, for example, elements such as a transformer, inverter, and rectifier. The internal elements convert and flow the sine AC power and thus serve as a source of generating a harmonic current H_current.

The harmonic current H_current generated at the power converter 200 flows through the ground portion 300 connected to each element.

Figure 11:
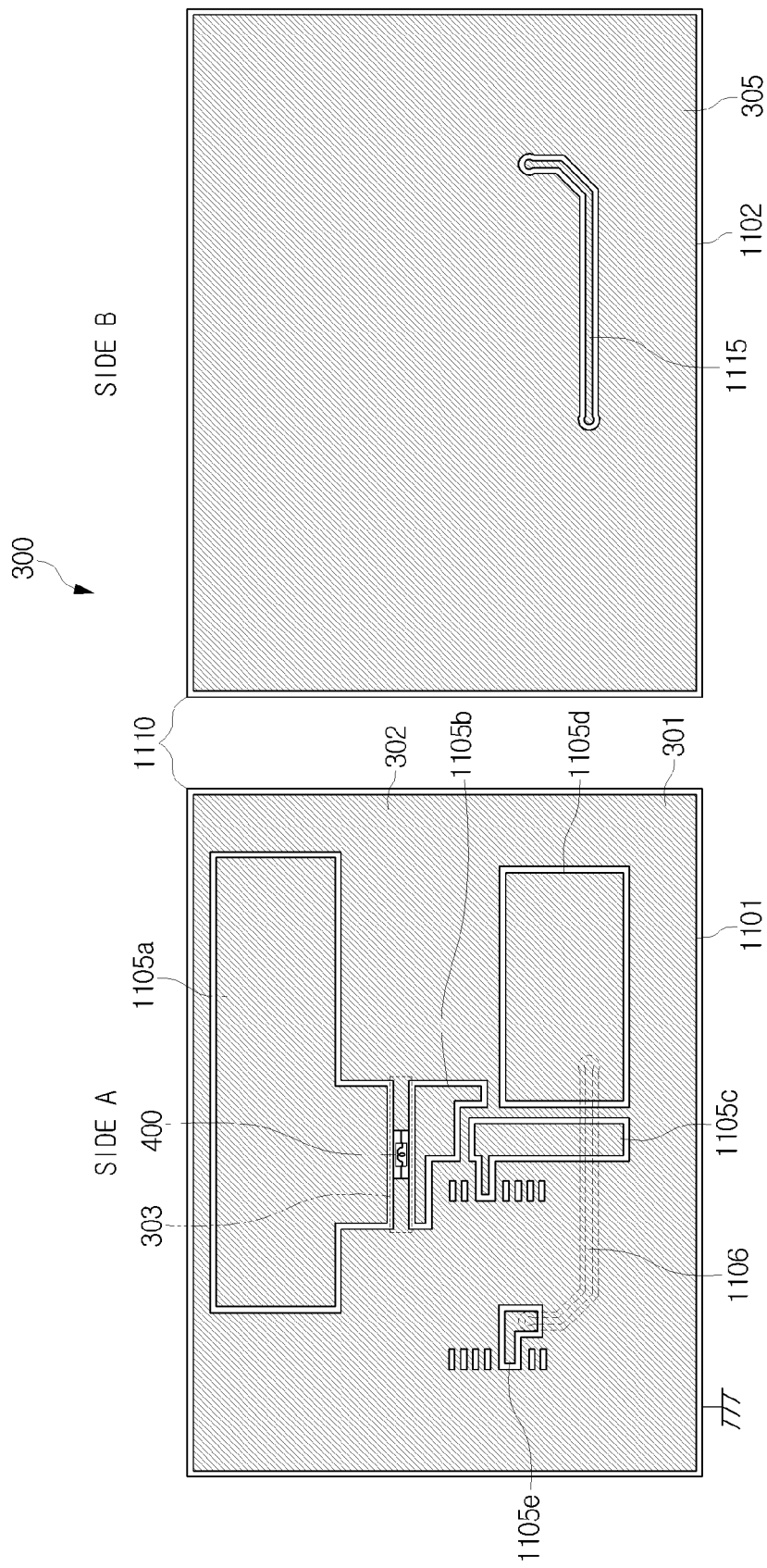
FIG. 11 is a diagram of an exemplary ground portion according to embodiments of the present general inventive concept.

The ground portion 300 supplies a ground voltage within an acceptable error range, for example, the ground voltage of 0V to the internal elements of the power converter 200. The ground portion 300 is laid out in a pattern 301, 305, as illustrated in FIG. 11, as wide as possible over a circumference or a preset area of a substrate 1110 of the power supply 100. The shape of the ground portion 300 may vary according to a different layout pattern of the different power supply 100.

The harmonic current H_current generating from the driving of the power converter 200 passes through the ground portion 300. Theoretically, since the ground portion 300 has the certain potential level, even when the harmonic current H_current is fed to the ground portion 300, it does not flow through the ground portion 300. In practice, as the different ground voltage GND is generated in every area of the ground portion 300 according to the layout pattern of the ground portion 300, the harmonic current H_current passes based on the potential difference of the ground portion 300.

For instance, in the layout illustrated in FIG. 11, the ground portion 300 can be formed in a wider pattern 302 with a smaller resistance along adjacent circuit patterns 1105a-1105e or in a narrow pattern 303 with a greater resistance. When the ground portion 300 is formed as above, the area 303 of the ground portion 300 having the greater resistance becomes high potential and the area 302 of the ground portion 300 having the smaller resistance becomes low potential.

Thus, the potential difference is produced and the harmonic current H_current passes through the ground portion 300.

The resistance of the ground portion 300 may vary according to a proximity to the adjacent circuit patterns 1105a-1105d. In an exemplary embodiment, the noise attenuator 400 is formed at a maximum resistance area of the ground portion 300. For example, when the ground portion 300 is laid out with a substrate 1110 and at least one connection line 1105c, a jumper area 1106 can be provided to each connection line. The jumper area 1106 is an area where one connection line 1115 jumps on another connection line 1105c at an intersection point of the two connection lines not to contact each other. To provide the jumper area 1106 to each connection line, the ground portion 300 and the noise attenuator 400 can be implemented using a circuit of the layered structure where a plurality of substrates 1110 or a plurality of layers 1101, 1102 is deposited. Thus, the resistance in the jumper area 1106 differs from the resistance of the other areas, and the potential difference caused by the resistance difference makes the harmonic current H_current pass through.

The noise attenuator 400 is connected to the ground portion 300 to block the path of the harmonic current H_current. In more detail, when the H_current is caused by the potential difference as mentioned above, the noise attenuator 400 is formed in a certain area of the ground portion 300 to shorten the harmonic current path passing through the ground portion 300.

For example, the noise attenuator 400 can be formed in the area of the maximum resistance among the areas of the variable resistance as described earlier.

Thus, the path of the harmonic current H_current flowing through the ground portion 300 is blocked by the noise attenuator 400 and thus shortened. As a result, the noise, which increases as the path increases by the resistance component of the harmonic current path, can be mitigated. This noise mitigation prevents the EMI characteristic degradation caused by the noise.

The power supply 100 is now explained in further detail.

Figure 2:
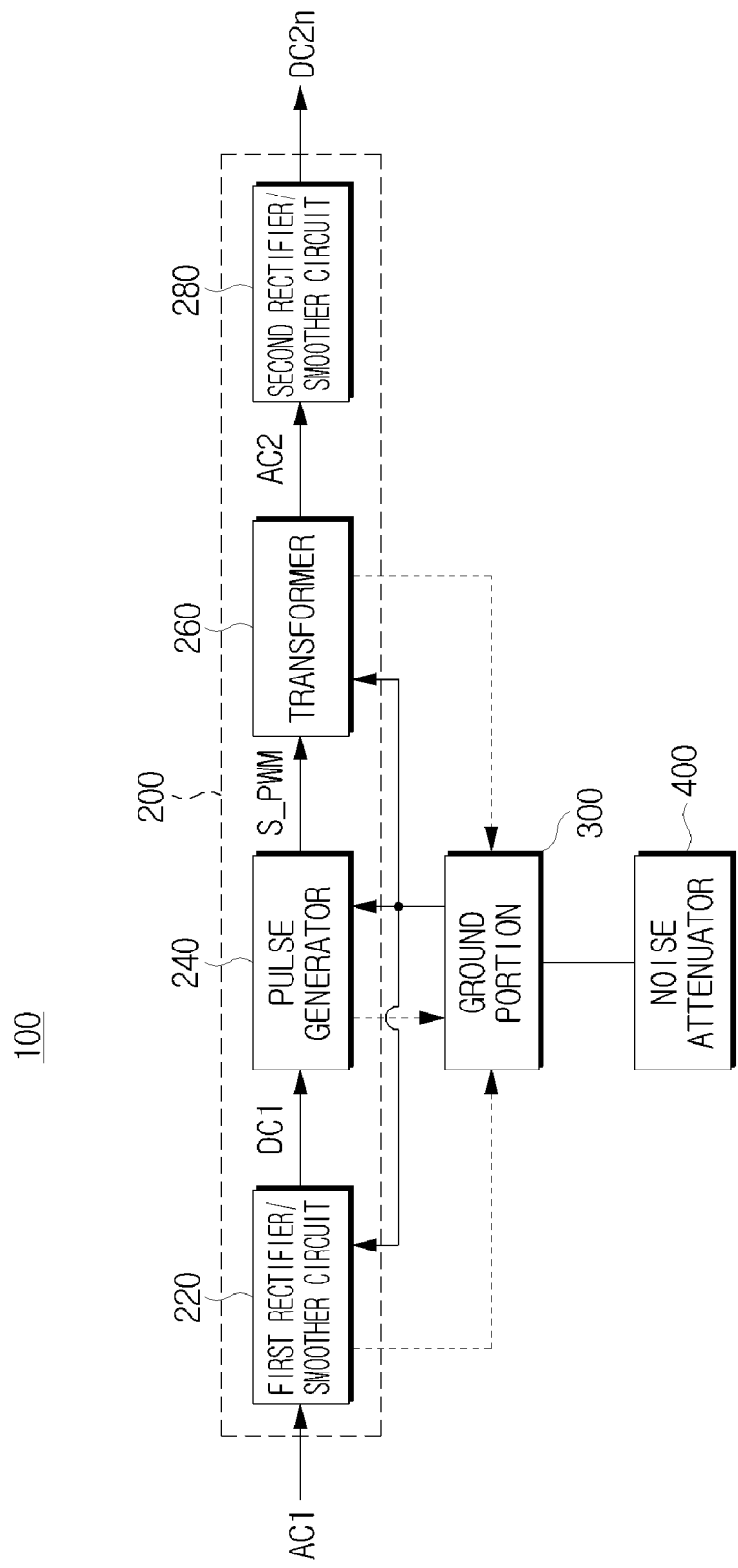
FIG. 2 is a detailed diagram illustrating the power supply according to an exemplary embodiment of the present general inventive concept.
Figure 3:
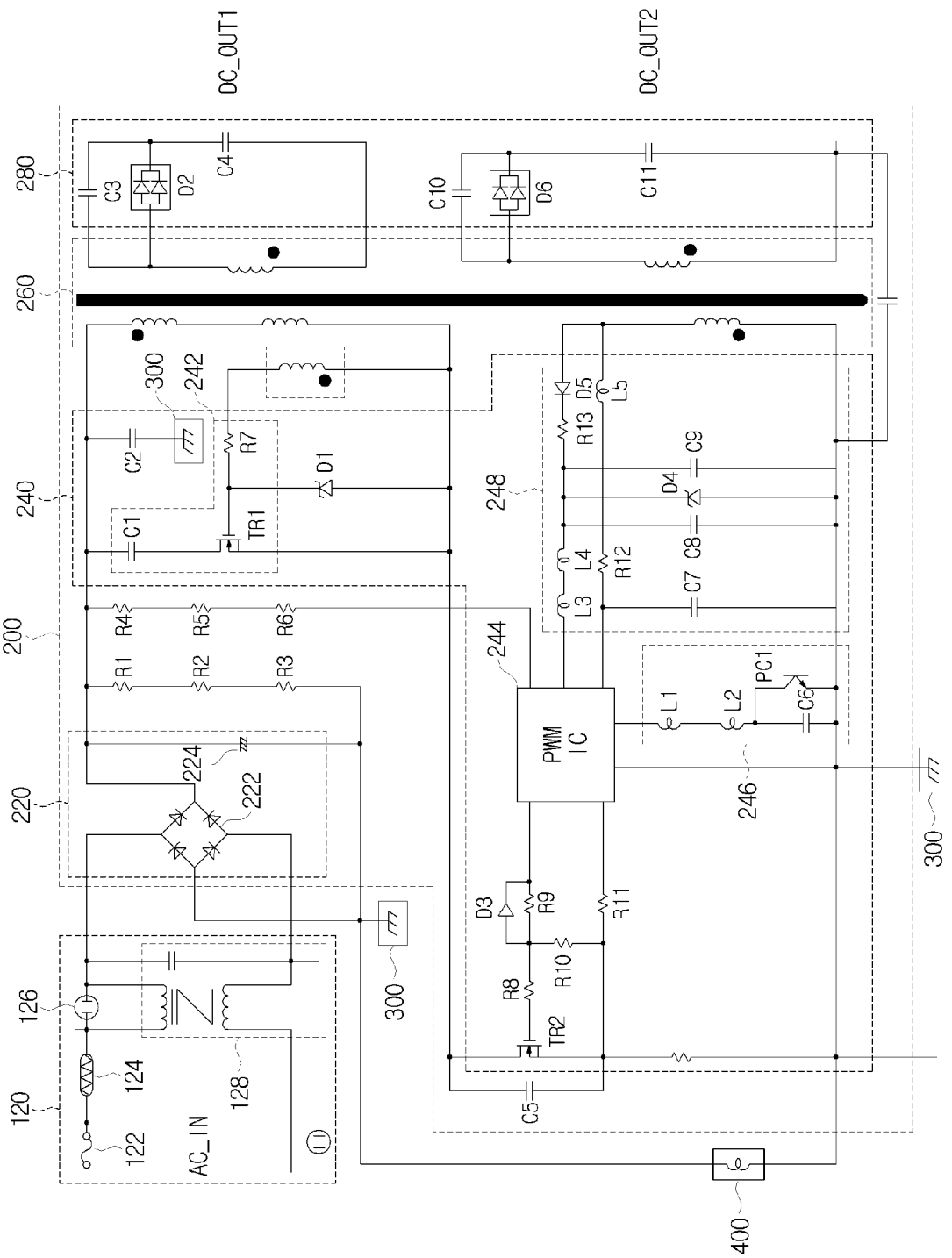
FIG. 3 is a detailed circuit diagram illustrating the power supply of FIG. 2.

FIG. 2 is a detailed diagram of the power supply 100 according to an exemplary embodiment of the present general inventive concept, and FIG. 3 is a detailed circuit diagram of the power supply 100 of FIG. 2.

The power supply 100 of FIG. 2 includes the power converter 200, the ground portion 300, and the noise attenuator 400.

The power converter 200 includes a first rectifier/smoother circuit 220, a pulse generator 240, a transformer 260, and a second rectifier/smoother circuit 280.

The first rectifier/smoother circuit 220 includes a rectifier element 222 (FIG. 3) and a smoother element 224 (FIG. 3) to receive and rectify a first AC power AC1 from an AC power input portion 120 which receives the commercial AC power AC_IN from the outside, smooth the rectified power, and generate and output a first DC power DC1.

The AC power input portion 120 to output the first AC power AC1 to the first rectifier/smoother circuit 220 is now described. As illustrated in FIG. 3, the AC power input portion 120 includes elements of a fuse 122, a varistor 124, and an arrester 126 to protect the power supply 100 when a potential level of the input AC power is greater than a preset potential level. The AC power input portion 120 also includes an LC filter 128 to remove the noise component from the input AC power.

The pulse generator 240 includes a switching element TR2, a snubber circuit 242, a pulse width modulator (PWM) IC 244, and an output voltage controller 246.

The snubber circuit 242 prevents switching loss caused by an overshoot or undershoot noise by counter electromotive force generated from an on/off operation of the switching element TR2.

The PWM IC 244 operates upon receiving a first DC power DC1 from the first rectifier/smoother circuit 220, generates a control signal fed to a gate of the switching element TR2, that is, a PWM signal to control the first DC power DC1 applied to the transformer 260 by switching to a high frequency of about 100 kHz, and outputs the PWM signal to the switching element TR2. The PWM IC 244 may employ a controller.

Since the PWM control scheme is used to control a duty ratio of the switching signal in this embodiment of the present general inventive concept, the PWM signal is generated by the PWM IC. It should be understood that proper ICs can be constituted respectively when a frequency control scheme to control a frequency of the switching pulse and a phase control scheme to control a phase of the switching pulse are used.

For example, the switching element TR2 can be constituted using a PNP transistor. The switching element TR2 controls the first DC power DC1 applied to a primary coil of the transformer 260 by switching on and off according to the PWM signal of the controlled duty ratio output from the PWM IC 244.

The output voltage controller 246 includes a light receiving element PC1 of a photocoupler which operates on and off based on a light from a light emitting element (not illustrated) of the photocoupler emitting according to power output through a second rectifier/smoother circuit 280, to control the PWM IC 244 to regulate the duty ratio according to the potential level of the output voltage DC2n (FIG. 2).

The output voltage controller 246 can include a comparator circuit (not illustrated) to which a reference power and the output power are applied, to output the control signal to the PWM IC 244 according to the level difference of the reference power and the output power.

A DC power receiving portion 248 in FIG. 3 is provided to receive the DC power from the transformer 260 which directly generates and supplies the DC power having the potential level different from the first DC power DC1 operating the PWM IC 244.

Referring to FIGS. 2 and 3, the transformer 260 can include the primary coil and at least one secondary coil facing the primary coil to convert the first DC power DC1 to the second AC power AC2 with the preset potential level based on a ratio of a number of turns of the primary coil and the secondary coil.

The second rectifier/smoother circuit 280 receives and rectifies the second AC power AC2 induced to the secondary coil of the transformer 260, generates and outputs the second DC power DC2n by smoothing the rectified power.

The second coil of the transformer 260 can include a plurality of secondary coils to generate a plurality of potential levels of different potential levels, for example, to generate the DC power of 5V or 24V, and the second rectifier/smoother circuit 280 can include rectifier elements D2 and D6 and smoother elements C4 and C11 connected to the coils as illustrated in FIG. 3.

While the DC powers are illustrated using the different reference numerals in FIGS. 2 and 3, the second DC power DC2n of FIG. 2 denotes that the DC power can be output with the different levels, and cover both the second DC powers DC_OUT1 and DC_OUT2 of FIG. 3.

The ground portion 300 supplies the ground voltage within an acceptable error range, for example, the ground voltage of 0V to the internal elements of the power converter 200. While the ground portion 300 illustrated as being formed in each element of the power converter 200 in the circuit diagram of FIG. 3, the pattern 301 can be formed in a circumference or the preset area of the circuit board and the elements are commonly grounded in the actual layout.

The noise attenuator 400 is connected to the ground portion 300 to block the flow path of the harmonic current H_current. When the harmonic current H_current is generated from the potential difference as described earlier, the noise attenuator 400 is formed in a certain area of the ground portion 300 to shorten the harmonic current path passing through the ground portion 300.

Accordingly, the noise attenuator 400 is connected to the ground portion 300 in the pattern area of the ground portion 300 as illustrated in FIG. 3, particularly, in the area of the maximum resistance among the areas of the variable resistance as illustrated in FIG. 1.

While the noise attenuator 400 is an inductor in FIG. 3, it can be formed using any circuit element having an inductance component and its type is not limited. For example, the noise attenuator 400 can be formed using a bead.

The noise attenuator 400 is constituted using the inductor or the bead because the inductance component passes the DC but not the harmonic AC H_current. Hence, the flow path of the unnecessary harmonic current can be blocked.

Therefore, the flow path of the harmonic current H_current passing through the ground portion 300 can be blocked by the noise attenuator 400 to shorten the harmonic current path. As a result, the noise, which increases as the path increases by the resistance component of the harmonic current path, is reduced. Accordingly, the degradation of the EMI characteristic caused by the noise can be prevented.

With the noise attenuator 400 formed in the power supply 100, the EMI generation information according to the driving of the power supply 100 is compared with examples.

Figure 4:
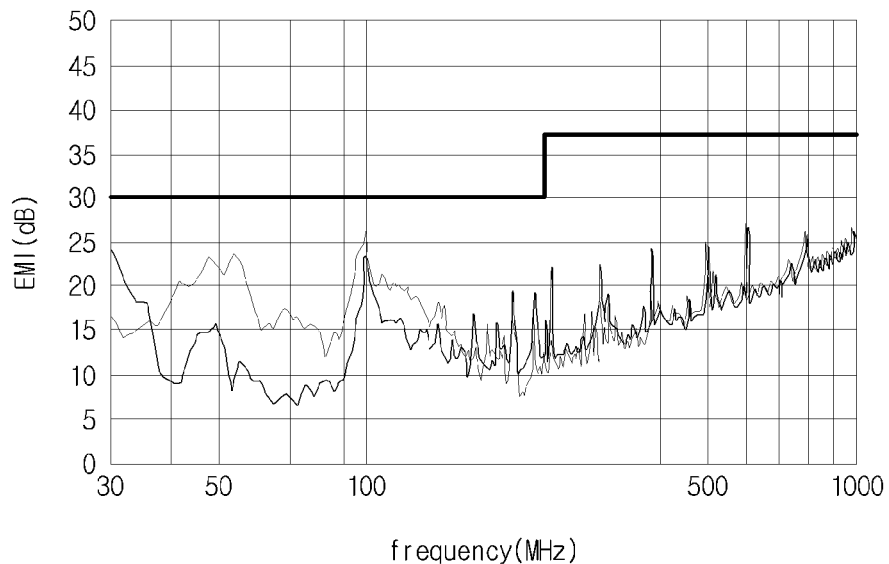
FIG. 4 is a graph of a waveform illustrating EMI generation according to a driving of the power supply of FIG. 3.
Figure 5:
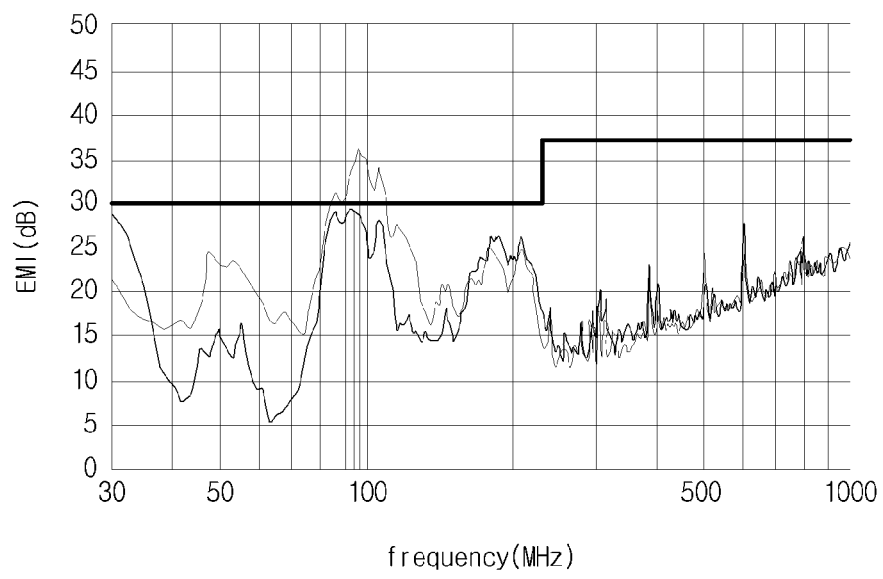
FIGS. 5, 6 and 7 are graphs of a waveform illustrating the EMI generation according to a driving of a power supply constructed differently from the power supply according to an exemplary embodiment of the present general inventive concept.
Figure 6:
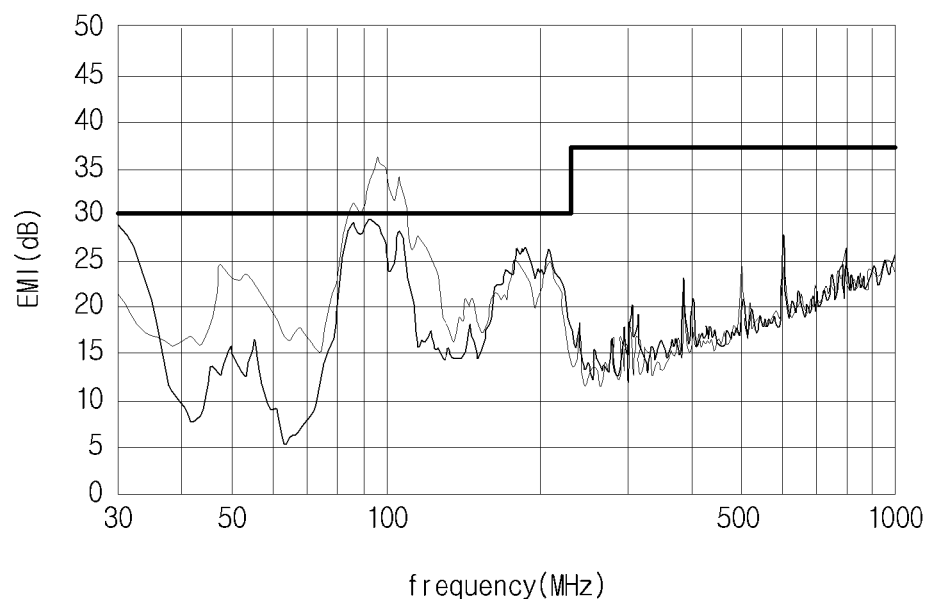
Figure 7:
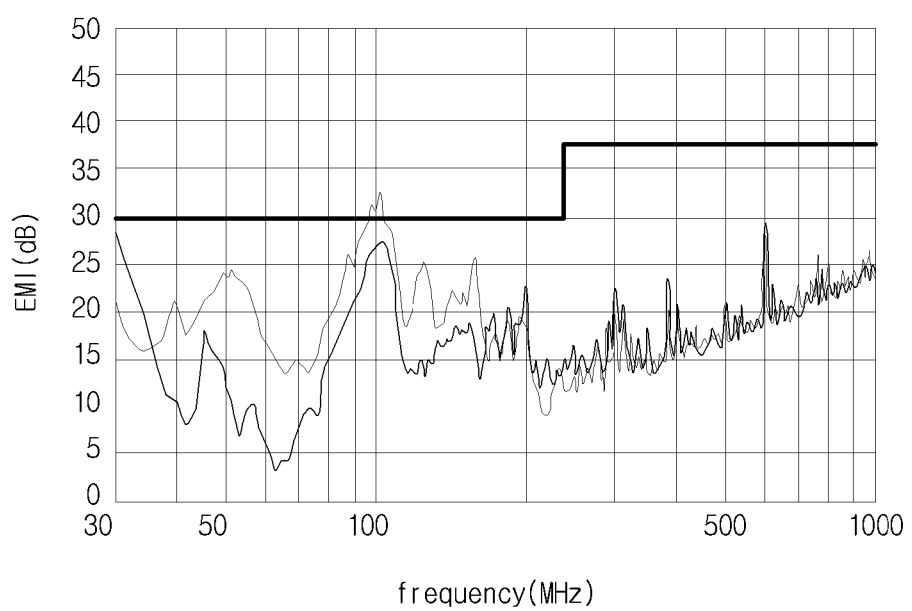

FIG. 4 is a graph of a waveform illustrating EMI generation when the power supply according to an exemplary embodiment of the present general inventive concept is used, and FIGS. 5, 6 and 7 are graphs of the waveform illustrating the EMI generation according to the driving of a power supply constructed differently from the power supply according to an exemplary embodiment of the present general inventive concept.

Particularly, FIG. 5 illustrates an EMI generation waveform when the noise attenuator 400 is removed from the power supply of FIG. 3, FIG. 6 illustrates the EMI generation waveform when the noise attenuator 400 is connected to the second rectifier/smoother circuit 280 in the power supply of FIG. 3, and FIG. 7 illustrates the EMI generation waveform according to the driving of the power supply when the resistance is generated at the non-optimal position, that is, at the non-maximum position.

As illustrated in FIGS. 4 through 7, according to a measurement, when the noise attenuator 400 is formed at the optimal position; that is, at the position of the maximum resistance as in the exemplary embodiment of the present general inventive concept, the EMI dB value lies within the frequency limitation (the dB value indicated by the thick solid line in the graphs). By contrast, when the noise attenuator 400 is not employed, the EMI dB value exceeds the limitation in the frequency band around 100 MHz and thus the EMI characteristic degrades as illustrated in FIG. 5.

When the noise attenuator 400 is formed in an output stage of the AC power, rather than an input stage, the EMI characteristic is not improved as illustrated in FIG. 6. When the noise attenuator 400 is formed at the non-optimal position, the EMI characteristic is slightly improved as illustrated in FIG. 7.

Figure 8:
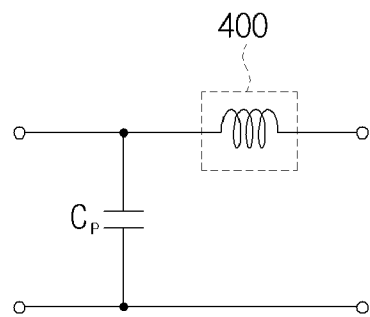
FIG. 8 is a diagram illustrating an additional function of the power supply according to an exemplary embodiment of the present general inventive concept.

FIG. 8 is a diagram illustrating an additional function of the power supply according to an exemplary embodiment of the present general inventive concept.

Referring now to FIGS. 3 and 8, when the noise attenuator 400 having the inductance component is formed together with the power supply 100, the circuit patterns 1105a-1105e adjacent to the pattern 302 of the ground portion 300 can be considered as the electrodes facing each other, and the parasitic capacitance exists between the circuit patterns 1105a-1105e adjacent to the ground portion 300 because the area therebetween can be considered as a dielectric. Since the noise attenuator 400 has the inductance component, a parallel LC filter can be formed by the parasitic capacitance and the inductance as illustrated in FIG. 8.

Accordingly, when the noise attenuator 400 is connected to the ground portion 300 as in the exemplary embodiment of the present general inventive concept, EMI radiation can be filtered by the parallel LC filter formed.

Figure 9:
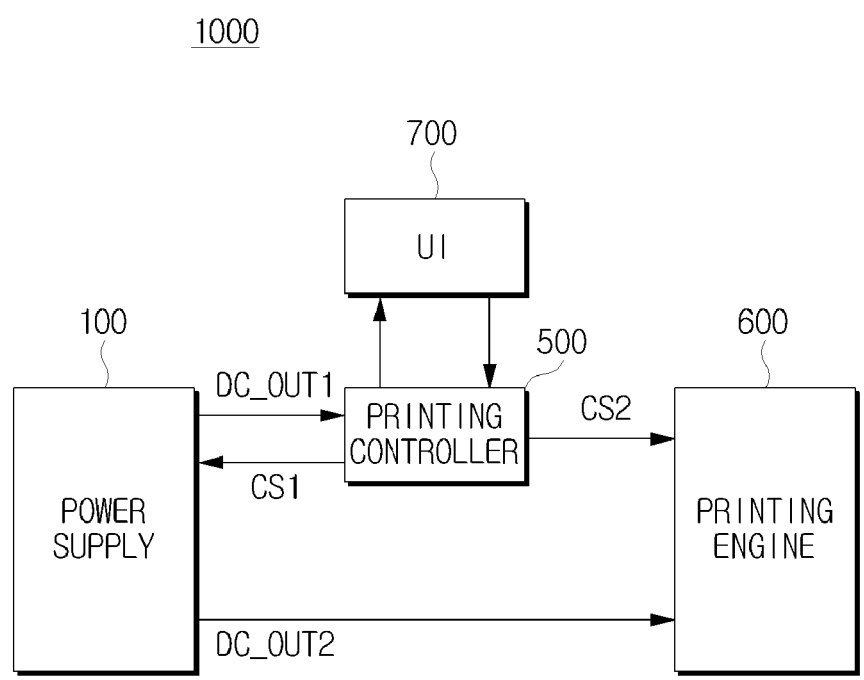
FIG. 9 is a simplified diagram illustrating an electronic device according to an exemplary embodiment of the present general inventive concept.

FIG. 9 is a simplified diagram illustrating an electronic device according to an exemplary embodiment of the present general inventive concept. To explain the electronic device in detail, an image forming apparatus such as a printer is used by way of example. It should be understood that the power supply 100 of FIGS. 1, 2, and 3 is applicable to any apparatus which converts AC power and supplies the converted power to internal circuit elements.

An electronic device such as an image forming apparatus 1000 of FIG. 9 includes a power supply 100, a printing controller 500, a printing engine 600, and a user interface (UI) 700.

The power supply 100 is constructed substantially the same as the power supply 100 of FIGS. 1, 2 and 3. Hence, the power supply 100 uses the same reference numeral. The power supply 100 has been described in detail above and shall not be explained further.

The printing controller 500 is driven by the first DC power DC_OUT2 output from the power supply 100 to receive printing data from a host device such as a computer and convert the received printing data to a bitmap image. The printing controller 500 controls an overall operation of the image forming apparatus 1000 by outputting a control signal CS1 to control the PWM IC 244 of the power supply 100 and outputting a control signal CS2 to control the components of the printing engine 600.

That is, the printing controller 500 controls the overall operation of the printing engine 600 to load and deliver a printing medium, form the bitmap image on the printing medium, fix the formed image, and discharge the printed printing medium, and controls the overall operation of the image forming apparatus 1000 to determine a printing error such as a paper jam during a printing job.

For instance, if the image forming apparatus 1000 is a laser printer, the printing engine 600 can include a fixing portion including an organophotoconductor (OPC) drum, a developer, and a fixer, and a laser scanning unit (LSU) for emitting the laser beam on the OPC drum.

Each component of the printing engine 600 is driven by the second DC power DC_OUT2 output from the power supply 100 and the control signal CS2 output from the printing controller 500, to form the bitmap image converted at the printing controller 500 on the printing medium as a certain image.

The UI 700 displays a driving status of the image forming apparatus 1000 to a user or provides control signals input from the user to the printing controller 500 under the control of the printing controller 500.

In an exemplary embodiment of the present general inventive concept, an operating portion can include the printing controller 500, the printing engine 600, and the UI 700 of the image forming apparatus 1000. In another embodiment, the operating portion can include one or more components to substantially perform a preset function of an electronic device.

Figure 10:
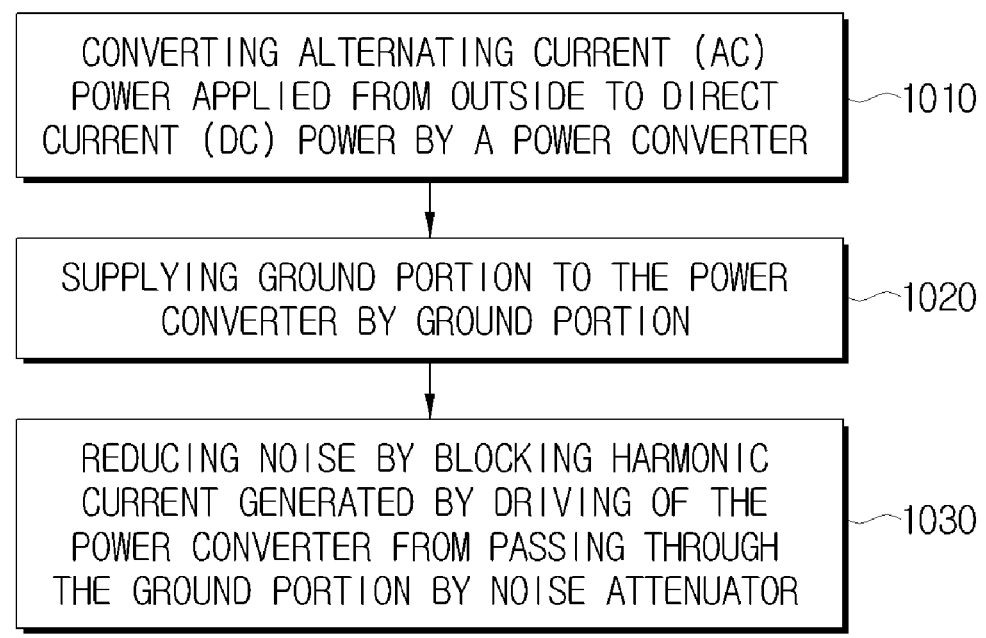
FIG. 10 is a flowchart illustrating a method of supplying power according to an exemplary embodiment of the present general inventive concept.

FIG. 10 is a flowchart illustrating a method of supplying power according to an exemplary embodiment of the present general inventive concept. Referring to FIG. 10, in 1010, alternating current (AC) power applied from outside is converted to direct current (DC) power by a power converter. In 1020, ground power is supplied to the power converter by a ground portion. In 1030, noise is reduced by blocking harmonic current generated by driving of the power converter from passing through the ground portion by a noise attenuator.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As set forth above, the elements of the power supply are commonly grounded to the ground portion to thus stably ensure the potential of the ground power of the elements.

By shortening the path of the harmonic current caused by the driving of the components, the noise from the harmonic current flow can be reduced.

Therefore, the EMI characteristic can be improved by suppressing the EMI radiation.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A power supply apparatus, comprising:
   a power converter to convert alternating current (AC) power applied from outside to direct current (DC) power;
   a ground portion electrically connected to the power converter at ground terminals thereof; and
   a noise attenuator electrically connected at all terminals thereof to the ground portion so as to reduce a harmonic current generated therein by the power converter.

2. The power supply of claim 1, wherein the noise attenuator comprises:
   an inductance component.

3. The power supply of claim 2, wherein the noise attenuator comprises:
   a bead.

4. The power supply of claim 1, wherein the noise attenuator is formed in a maximum resistance area in a region of the ground portion.

5. The power supply of claim 4, wherein the ground portion comprises:
   a conductive pattern formed on a substrate, the conductive pattern including a plurality of connection lines, the noise attenuator being formed in at least one of a location in the conductive pattern where a distance between one of the connection lines and another of the connection lines relatively decreases and a location in the conductive pattern where a cross-section of one of the connection lines relatively decreases.

6. The power supply of claim 4, wherein the ground portion comprises:
   a conductive pattern formed on a substrate, the conductive pattern including a plurality of connection lines and a jumper area at which one of the connection lines crosses another of the connection lines without electrical contact therebetween, the noise attenuator being formed in the jumper area.

7. The power supply of claim 1, wherein the power converter comprises:
   a first rectifier/smoother circuit electrically coupled to the ground portion to convert the AC power to a first DC power;
   a pulse generator electrically coupled to the ground portion and driven by the first DC power to generate a pulse signal of a preset period;
   a transformer, electrically coupled to the ground portion and driven by the pulse signal to convert the first DC power to a second AC power of a preset level; and
   a second rectifier/smoother circuit to convert the second AC power to the second DC power.

8. The power supply of claim 7, wherein the pulse generator is a pulse width modulator (PWM).

9. An electronic device, comprising:
   a power supply to convert externally supplied AC power to a driving power and to output the driving power, the power supply comprising:
      a power converter to convert the AC power to the driving power;
      a ground portion electrically connected to the power converter through ground terminals thereof; and
      a noise attenuator electrically connected at all terminals thereof to the ground portion; and
   an operating portion to perform a predetermined function, the operating portion including at least one internal element which is driven by the output driving power.

10. The electronic device of claim 9, wherein the operating portion comprises:
    an image forming apparatus to print image data on a recording medium using the driving power.

11. The electronic device of claim 9, wherein the noise attenuator comprises:
    an inductance component.

12. The electronic device of claim 11, wherein the noise attenuator comprises:
    a bead.

13. The electronic device of claim 9, wherein the power converter comprises:
    a first rectifier/smoother circuit electrically coupled to the ground portion to convert the AC power to a first DC power;
    a pulse generator electrically coupled to the ground portion and driven by the first DC power to generate a pulse signal of a preset period;

a transformer electrically coupled to the ground portion and driven by the pulse signal to convert the first DC power to a second AC power of a preset level; and a second rectifier/smoother circuit to convert the second AC power to the driving power.

14. The electronic device of claim 9, wherein the noise attenuator is formed in a maximum resistance area in a region of the ground portion.

15. The electronic device of claim 14, wherein the ground portion comprises:

a conductive pattern formed on a substrate, the conductive pattern including a plurality of connection lines and a jumper area at which one of the connection lines crosses another of the connection lines without electrical contact therebetween, the noise attenuator being formed in the jumper area.

16. The electronic device of claim 14, wherein the ground portion comprises:

a conductive pattern formed on a substrate, the conductive pattern including a plurality of connection lines, the noise attenuator being formed in at least one of a location in the conductive pattern where a distance between one of the connection lines and another of the connection lines relatively decreases and a location in the conductive pattern where a cross-section of one of the connection lines relatively decreases.

17. A power supply apparatus comprising:

a plurality of power processing components electrically connected in common at respective ground terminals thereof, the plurality of power processing components including at least one switching component;

a ground portion to provide a common potential across the ground terminals of the power components, the ground portion including a conductive pattern formed on a substrate, a region of which is formed such that electrical resistance therein is relatively maximal to that in other regions of the ground portion; and a noise attenuator electrically coupled to the ground portion so as to provide a frequency-dependent alternate electrical path therein at the region of maximal resistance.

18. The power supply apparatus of claim 17, wherein the noise attenuator further comprises:

a reactive electrical component to form the alternate electrical path, the reactive electrical component being of a characteristic value so that current flowing in the ground portion produces a measurable noise value not exceeding a predetermined threshold value.

19. The power supply apparatus of claim 18, wherein the noise value is measured at a harmonic frequency of the current in the ground portion established by at least the switching component.

20. A power supply apparatus, comprising:

a ground portion to provide a ground potential to components of the power supply apparatus; and a noise attenuator unit electrically connected at all terminals thereof to the ground portion, the noise attenuator unit disposed at a maximum resistance portion of the ground portion to reduce an electrical path length through which a harmonic current passes through the ground portion.

21. The apparatus of claim 20, wherein the noise attenuator unit comprises:

at least one of a coil inductor and an inductive bead.

22. The apparatus of claim 20, wherein the noise attenuator unit prevents an electromagnetic interference (EMI) dB value from exceeding a predetermined value at 100 Mhz.

23. A method of supplying power, the method comprising:

converting externally applied alternating current (AC) power to direct current (DC) power by a power converter;

supplying ground power to the power converter by a ground portion; and reducing noise by blocking harmonic current generated in the ground portion by driving of the power converter from passing through a predetermined region of the ground portion by providing an alternate path thereat through a noise attenuator.

24. A power supply apparatus, comprising:

a plurality of components;

a ground portion to provide a common ground for the plurality of components; and a noise attenuator connected at all electrical terminals thereof to the ground portion to reduce a harmonic current passing through the ground portion.

* * * * *